March 26, 1957  E. BACHMAN  2,786,383
CAM OPERATED BALL DETENT CLEVIS PIN
Filed Oct. 12, 1953
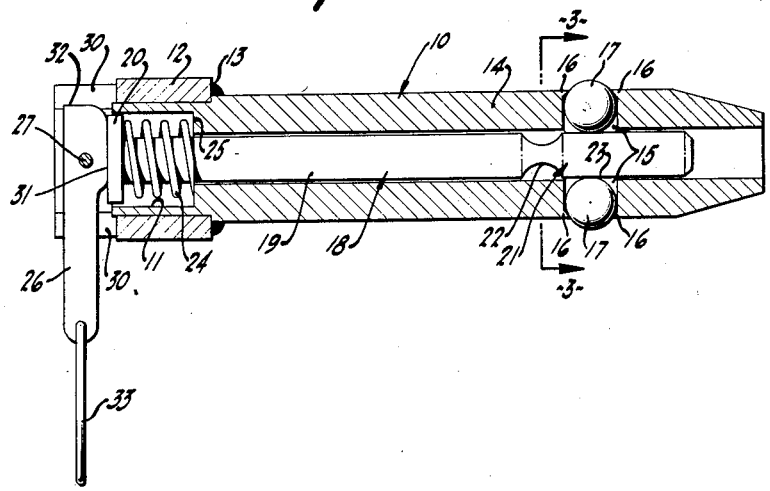
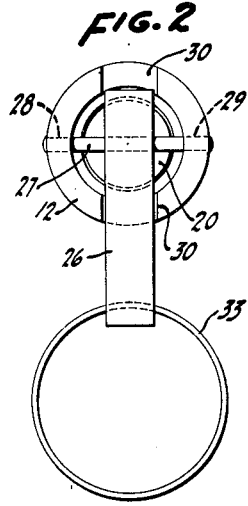
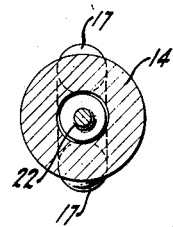
INVENTOR.
EUGENE BACHMAN
BY
ATTORNEYS

2,786,383
Patented Mar. 26, 1957

2,786,383

CAM OPERATED BALL DETENT CLEVIS PIN

Eugene Bachman, San Fernando, Calif., assignor to D. W. Price Corporation, Los Angeles, Calif., a corporation of California Application October 12, 1953, Serial No. 385,363

1 Claim. (Cl. 85—5)

The present invention relates to clevis pins of the type used as a temporary locking device, and more particularly to certain new and useful improvements in the so-called "automatic" clevis pin of the type illustrated in the pending application for patent Serial Number 366,144, filed July 6, 1953.

Automatic clevis pins are not broadly new and many such pins have been devised and constructed which carry near their ends a lock part that is inwardly and outwardly moveable at the will of the user to permit the pin to be inserted into a hole formed in one or more plates constituting a clevis, and to be withdrawn from such clevis hole when and as desired and reused. As illustrated in the aforesaid pending application, when the stem 2 is pressed into the tube 1, as by manual pressure, the low part 17 of the stem cam is moved adjacent the balls 16 which are thus permitted to move inwardly in a radial direction so as not to protrude beyond the exterior of the tube shank 5 as the tube 1 is slid into a clevis hole. When the end of the tube 1 and the balls 16 are through the clevis, the balls 16 are then forced to protrude radially from the tube by the return of the stem 2 to its normal position, as through the action of the spring 7, which locks the clevis pin in the hole. When desired, removal of the clevis pin may be effected by again pressing the stem 2 into the tube 1 to permit the balls to move radially inwardly and the clevis pin is withdrawn from the hole and reused as required.

In inserting a clevis pin of the above type in the clevis hole, it is often found necessary or expedient to forcefully drive the shank of the pin through the hole, particularly in the case where there is a relatively tight fit between the shank of the pin and the sides of the clevis hole or where the holes in two or more plates constituting the clevis are not in exact alignment, and the automatic clevis pins devised and constructed heretofore have not proved generally satisfactory under such circumstances both with respect to insertion and securing the clevis pin in such hole and to the release and removal of the pin therefrom. Under such conditions, the forceful driving of the clevis pin through the clevis hole often results in damage to the operating mechanism of the pin with the result that the holding power of the pin is substantially weakened or lost altogether and the pin when removed cannot be reused. Moreover, when a clevis pin of the type illustrated in the aforesaid pending application is so securely positioned in the clevis hole, it is often difficult or inconvenient to manually remove the pin since the user must not only effect a release of the locking parts, as by pressing the stem 1 into the tube 2, but must also simultaneously pull on the pin to effect a withdrawal of the pin from the clevis hole.

The above noted defects of the prior art are remedied in accordance with the present invention wherein certain new and useful improvements are provided in an automatic clevis pin of the type illustrated in the aforesaid pending application, which by virtue of such improvements will be of simple and sturdy construction and inexpensive to manufacture, and may be forcefully inserted in the clevis hole under the adverse conditions described above without damage to the pin or to its operating mechanism, and, when desired, may be manually removed therefrom in a convenient and simple manner.

More specifically, the present invention contemplates the provision in an automatic clevis pin including a tubular member having a head at one end adapted to limit movement of the member into a clevis and having at least one radial aperture in the opposite end, a locking element radially moveable in the aperture, means for moving the locking element from a position within the periphery of the tubular member to a position in which it extends beyond the periphery thereof, comprising a stem slidably disposed within the tubular member having a camming portion adjacent the locking element and a spring between the stem and the tubular member for moving the camming portion into ejecting engagement with the locking element: of a novel operating means which may be selectively positioned in a first position whereby the stem is activated against the action of the spring to bring the camming portion into non-ejecting relation with the locking element, and in a second position whereby the stem will be moved by the action of the spring to bring the camming portion into ejecting engagement with the locking element. When the operating means is in the second position, the camming portion of the stem may, through the action of the spring, be in either ejecting or non-ejecting relation with the locking device and the means will be so disposed with respect to the head end of the tubular member that the member can be forceably driven into the clevis hole without damage to the operating mechanism of the clevis pin. When such means is then moved to the first position, as to withdraw the clevis pin from the hole, the stem will be moved and maintained in non-ejecting relation with the locking device and the means will be so disposed with respect to the longitudinal axis of the clevis pin that movement of the operating means to such position can be effected simultaneously with a withdrawal of the clevis pin from the hole.

In accordance with the preferred embodiment of the present invention, the above-described operating means comprises a rockable lever carried by the head of the tubular member in engagement with an end of the stem. The lever has a cam portion effective upon rocking of the lever to a first position, in which it extends in axial alignment with the stem, to move the stem against the urge of the spring thereby moving the camming portion of the stem into non-ejecting relation with the locking element, and upon rocking to a second position, in which it extends at a right angle to the stem, to permit the return of the stem through the urge of the spring thereby permitting the camming portion of the stem to move from non-ejecting to ejecting engagement with the locking element. A slot is provided in the head of the tubular member in which the lever when in the second position is adapted to lie in order to permit the clevis pin to be driven into the hole without striking the lever and damaging the operating mechanism.

The above as well as other novel features of the clevis pin according to the present invention will be more readily understood from the following description of the accompanying drawings illustrating the invention in accordance with its preferred embodiment, in which drawings:

Figure 1 is a longitudinal sectional view of the clevis pin embodying the preferred form of the invention;

Figure 2 is an end view of the head end of the clevis pin shown in Figure 1; and Figure 3 is a transverse sectional view of the line 3—3 of Figure 1.

As shown in the drawings, the clevis pin according to the preferred embodiment of the invention includes a tubular member 10 having a counterbored end portion 11. A tubular head member 12 is secured in the manner shown to the end portion of the tubular member 10 in surrounding relation to the bore 11 and provides a work engaging shoulder 13. While the tubular member 10 and head member 12 are shown as two separate elements, they may, as is apparent, be fabricated from a single piece. Near the point of the shank 14 of the tubular member 10 there are formed one or more radial apertures or holes 15 each having a restricted outer portion 16 formed therein as by peening or staking the exterior of the shank 14 adjacent each opening. In each hole 15 there is placed a ball 17 which is radially moveable in its hole from a position where a portion of the ball protrudes beyond the exterior of the shank, the ball being prevented from further radial outward movement by the restricted portion 16, to a position where it does not protrude, and means, generally designated as 18, are provided for selectively moving the balls 17 between the two such positions.

As shown in Figure 1, the means 18 comprises a stem 19 which is co-axially disposed and slidable within the tubular member 10, having at one end an enlarged head portion 20 which is readily slidable within the bore 11 and at the other end a camming portion, generally designated as 21, which is slidable in adjacent relationship with respect to the radial holes 15. The cam portion 21 is formed in the stem 19 by recessing or necking a portion of the stem, as at 22, whereby such recess will act as a low point, or cam fall, and the portion of the stem between the recess 22 and the end of the stem, as at 23, will act as a high point, or cam rise. As is apparent, when the stem 19 is moved in an axial direction within the tubular member 10 as to bring the cam rise 23 adjacent the wall openings of the radial holes 15, the balls 17 will be ejected so as to protrude beyond the exterior of the shank of the tubular member 10; and when moved to bring the cam fall 22 adjacent such openings, the balls will be free to move inwardly to a position where they do not protrude. Within the counterbored portion 11 of the tubular member 10 there is provided a compression spring 24 in an encircling arrangement concentrically disposed around the stem 19 between the inner face of its head 20 and the shoulder 25 formed by the bore 11 in the tubular member 10.

Means are provided for retaining the stem 19 within the tubular member 10 and for selectively positioning the stem 19 in an axial direction and against the urge of the spring 24 whereby the camming portion 21 of the stem will be moved into and out of ejecting engagement with the balls 17. In accordance with the preferred embodiment of the invention a lever 26 is pivotally secured near one end to a pin 27 which is passed through diametrically opposed openings 28, 29 in the tubular head member 12. As shown in Figures 1 and 2, the tubular head member is slotted, as at 30, and the lever 26 is rockable from a first position as shown in the drawings in which the lever 26 extends at a right angle to a longitudinal axis of the stem 18 and is disposed within the slot 30, to a second position in which the lever 26 extends in axial alignment with the longitudinal axis of the stem 18. The lever 26 is provided with a rectangularly shaped cam portion which normally bears on the outer face of the head 20 of the stem 19, comprising a flat portion 31, or cam fall, extending parallel to the length of the lever 26, and an outer toe portion 32, or cam rise, extending at right angles to the length of the lever 26, the outer corner between the two portions 31 and 32 being slightly rounded (see Figure 1). By this construction motion of the lever 26 from the abovesaid first position, in which the cam fall 31 of the lever engages the outer face of the head 20 of the stem 19 and the cam rise 23 of the stem 19 engages the balls 17 in ejecting relation, to the aforesaid second position, in which the cam rise 32 of the lever 26 engages the head 20, moves the stem 19 inwardly and against the urge of the spring 24 (or to the right as shown in Figure 1) whereby the cam fall 22 of the stem 19 will be brought into adjacent relation with respect to the inner openings of the radial holes 15 as to permit the balls 17 to move inwardly to a non-ejecting position. A ring 33 is placed through a hole in the outer end of the lever 26 to facilitate carrying and operation of the lever 26.

It will accordingly be seen that the automatic clevis pin according to the preferred embodiment of the invention as described above is capable of use under conditions where is must be forcefully inserted in a clevis hole without damage to the operating mechanism of the clevis pin, and may be manually removed therefrom in a convenient and simple manner and reused as desired. When the lever 26 is selectively positioned in axial alignment with the stem 18, the camming portion 21 of the stem 18 will be in non-ejecting relation with the balls 17 which will readily move inwardly into the cam fall 22 of the stem 18 as the end portion of the shank is inserted into a hole in one or more plates constituting a clevis. In order to forcefully drive the clevis pin through the hole of the clevis, the lever 26 is then selectively positioned as to extend at a right angle to the stem 18, in which position it is disposed within the slot 30, the balls 17 being held in the cam fall 22 by the side walls of the clevis hole and thus preventing the return of the stem 18 through the urge of the spring 24. As is apparent, the head of the tubular head member 12 may then be conveniently driven by means of a hammer or other suitable tool. When the clevis pin is driven through the hole as to bring the shoulder 13 into engagement with the outer surface of the clevis plate, the end portion of the shank will extend through the clevis and the balls 17 will be automatically ejected to protrude beyond the exterior of the shank, locking the clevis between the same and the work engaging shoulder 13, by the return of the stem 18 through the urge of the spring 24 to the position shown in Figure 1 and the bringing of the cam rise 23 into ejecting relation with the balls 17. When it is necessary to remove the clevis pin, the lever 26 is again moved into axial alignment with the stem 18, which as described above will bring and maintain the cam fall 22 of the stem 18 into non-ejecting relation with the balls 17, by pulling the ring 33 outwardly and in a longitudinal direction with respect to the longitudinal axis of the lever 26 and stem 18, which pulling will simultaneously effect a withdrawal of the clevis pin from the clevis hole.

What is claimed is:

In a clevis pin of the character described comprising a tubular member adapted for insertion into a closely fitting cylindrical opening of a clevis and having a slotted head at one end adapted to limit movement of said member into said opening, at least one radial aperture in said member adjacent the end opposite said head, a ball radially movable in said aperture, means for moving said ball from a position in which said ball lies wholly within the periphery of said member to a position in which a portion of said ball extends beyond the periphery of said member comprising a stem slidably disposed within said member; said stem having a portion of reduced diameter adjacent said ball presenting a cam for moving said ball between said positions as an incident to movement of said stem within said member, and a spring between said member and said stem for moving said cam into engagement with said ball; a pivot pin extending transversely of said slotted head and having an axis intersecting a line coinciding with the axis of said stem, a lever pivotally mounted on said pin and having a cam portion thereon; said lever being movable from a first position in which the cam portion thereof lies entirely within the slot in said head to a second position in which said cam portion is effective to move said stem against the urge of said spring, thereby moving the cam on said stem out of engagement with said ball, and a ring mounted on one end of said lever on a line coinciding with the axis of said stem when said lever is in said second position.

References Cited in the file of this patent

UNITED STATES PATENTS

| | | |
|---|---|---|
| 1,106,159 | Rawlins | Aug. 4, 1914 |
| 2,303,260 | Rebaylio | Nov. 24, 1942 |
| 2,373,083 | Brewster | Apr. 3, 1945 |
| 2,408,560 | Keehn | Oct. 1, 1946 |
| 2,515,807 | Spooner | July 18, 1950 |

FOREIGN PATENTS

| | | |
|---|---|---|
| 555,374 | Great Britain | Aug. 19, 1943 |